United States Patent [19]
Anderson

[11] Patent Number: 5,271,212
[45] Date of Patent: Dec. 21, 1993

[54] LAWNMOWER BLADE WITH YIELDABLE OPPOSITE OUTER CUTTING SECTIONS

[76] Inventor: Ray S. Anderson, 306 Maple St., Bell Buckle, Tenn. 37020

[21] Appl. No.: 996,315

[22] Filed: Dec. 23, 1992

[51] Int. Cl.⁵ .............................................. A01D 34/68
[52] U.S. Cl. ...................................... 56/12.7; 56/255; 56/295
[58] Field of Search ............... 56/12.7, 17.5, 255, 56/295, DIG. 17, DIG. 20

[56] References Cited

U.S. PATENT DOCUMENTS

| | | | |
|---|---|---|---|
| 3,507,104 | 4/1970 | Kline et al. | 56/12.7 X |
| 4,313,297 | 2/1982 | Maier | 56/295 |
| 4,471,603 | 9/1984 | Veltin, Jr. | 56/295 |
| 4,525,990 | 7/1985 | Zweegers | 56/295 |
| 4,594,843 | 6/1986 | Andersson et al. | 56/295 |
| 5,090,186 | 2/1992 | Anderson | 56/255 |

FOREIGN PATENT DOCUMENTS 2612381 10/1977 Fed. Rep. of Germany ........ 56/295

*Primary Examiner*—Terry Lee Melius
*Attorney, Agent, or Firm*—John R. Flanagan

[57] ABSTRACT

A lawnmower blade includes a center blade section having an opening for mounting and fastening the blade to the lower end of a mower drive shaft and a pair of opposite outer blade sections containing cutting edges. The outer blade sections are substantially equal in length to one another. Also, the blade includes a pair of assemblies defining yieldable articulating joints attaching one end portion of each outer blade section to one of the opposite end portions of the center blade section such that each outer blade section can both pivot upwardly and rotate backwardly relative to the forward direction of blade rotation and to the respective one opposite end portion of the center blade section so as to yield upon striking an object and thereby prevent damage to the engine crankshaft or the cutting edges. The outer blade sections are capable of restoring to straightened longitudinal alignment with the center blade section, after passing the object, due to response to centrifugal force imposed on the outer blade sections by their rotation with the center blade section.

17 Claims, 1 Drawing Sheet

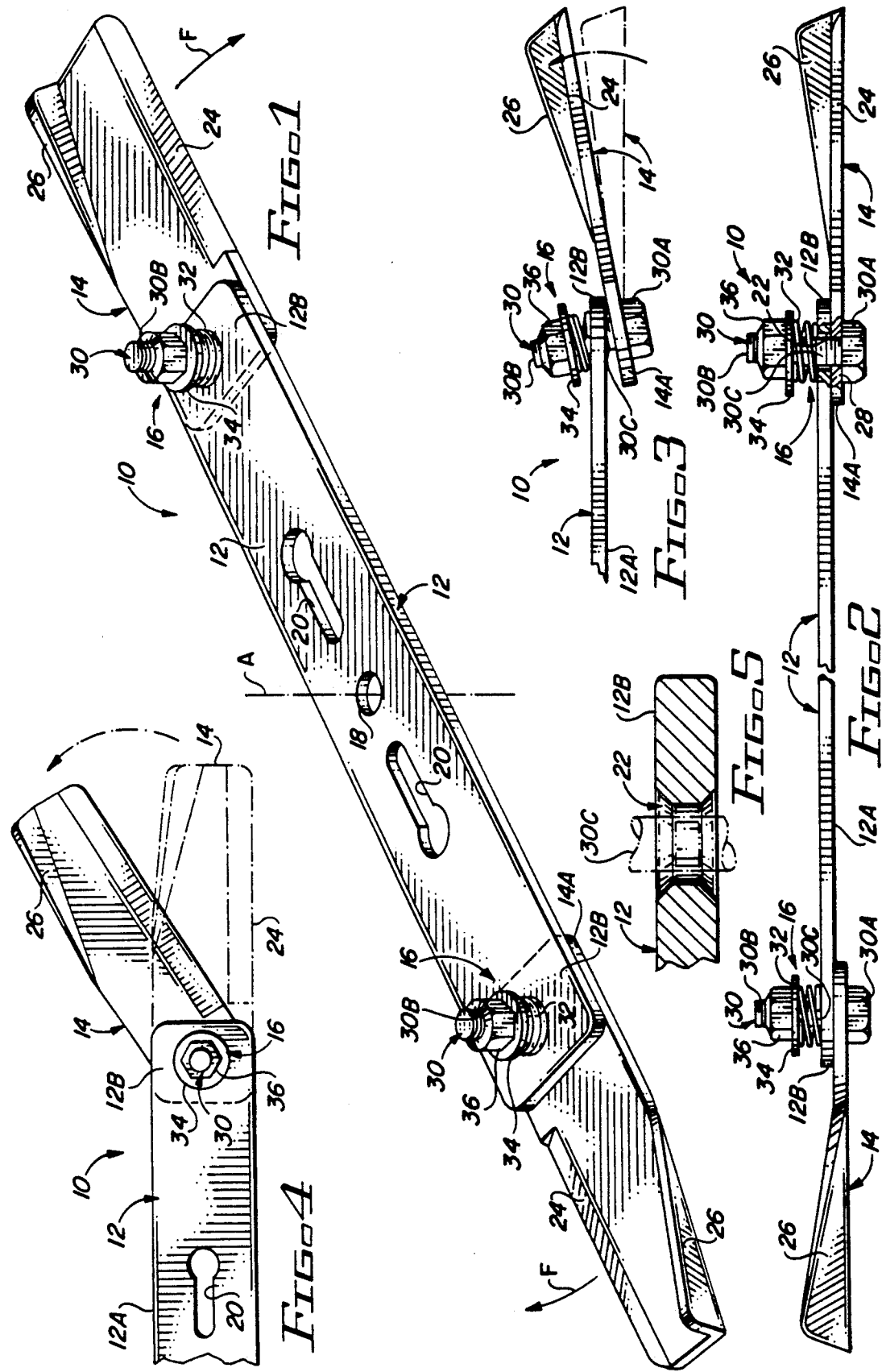

LAWNMOWER BLADE WITH YIELDABLE OPPOSITE OUTER CUTTING SECTIONS

BACKGROUND OF THE INVENTION

1. Field of the Invention

The present invention generally relates to the construction of lawnmower blades and, more particularly, is concerned with a lawnmower blade having pivotally yieldable opposite outer cutting sections for limiting or avoiding damage.

2. Description of the Prior Art

Residential lawnmowers in widespread use at the present time are of the type having an internal combustion engine mounted upon a deck and a vertical rotary crankshaft extending downwardly from the engine to below the deck. The lawnmower also has a rigid blade secured at a central region of the blade to a lower end of the crankshaft. Cutting edges are defined on opposite outer end portions of the blade which lead in the direction of rotation of the crankshaft and blade for cutting grass in a circular path as the lawnmower travels across a lawn.

Vertical crankshafts of lawnmowers of this type with the rigid blades attached directly to the lower end of the crankshafts are susceptible to bending when the blade strikes a large or solid object, such as a large rock, a tree root, etc., as the lawnmower travels across the lawn. The bent crankshaft must be taken to a mechanic for straightening before the lawnmower can be used again. Until recently, most crankshafts could be straightened one time. Now, because of the potential for liability claims to arise from injuries alleged to have been the result of inadequately straightened crankshafts, many mechanics refuse to perform this service. The lawnmower owner is then left with the choice of replacement of an expensive crankshaft or the purchase of a new lawnmower.

Consequently, a need exists for a way to prevent or minimize damage to the crankshaft in the first place.

SUMMARY OF THE INVENTION

The present invention provides a damage-limiting lawnmower blade construction designed to satisfy the aforementioned need. The lawnmower blade of the present invention has a center mounting section and a pair of outer cutting sections which normally rotate with the center mounting section to carry out normal grass cutting operation. However, the outer cutting sections are mounted to the opposite end portions of the center section so as to be capable of yieldable pivoting in upwardly and rearward directions relative to the direction of rotation of the blade upon striking an obstruction. In such manner, the force of the impact is absorbed by the outer cutting sections and the hardware mounting them to the center mounting section of the blade and is not transmitted to the crankshaft or drive shaft. After passing over the obstruction, the centrifugal force of the rotating blade causes the outer cutting sections to pivotally straighten out and return to aligned positions with the central mounting section of the blade.

Accordingly, the present invention is directed to a damage-limiting lawnmower blade which comprises: (a) a center blade section having a pair of opposite end portions and means for mounting the blade to a lower end of a mower drive shaft; (b) a pair of opposite outer blade sections each having a cutting edge; and (c) a pair of yieldable articulating joints each attaching one end portion of each of the outer blade sections to one of the opposite end portions of the center blade section such that each of the outer blade sections can both pivot upwardly and rotate backwardly relative to a forward direction of blade rotation and to a respective one of the opposite end portions of the center blade section so as to yield upon striking an object and thereby prevent damage to the mower drive shaft and the cutting edges on the yielding outer blade sections.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a damage-limiting lawnmower blade of the present invention.

FIG. 2 is a foreshortened side elevational view of the blade.

FIG. 3 is a fragmentary side elevational view of the blade of FIG. 2, illustrating one of the outer cutting sections after deflecting to a damage avoidance position upon striking an obstruction.

FIG. 4 is a top plan view of the portion of the blade shown in FIG. 3.

FIG. 5 is an enlarged longitudinal sectional view of a mounting hole through each one of the opposite end portions of the center mounting section of the blade.

DETAILED DESCRIPTION OF THE INVENTION

Referring to the drawings and particularly to FIGS. 1 to 3, there is illustrated a lawnmower blade, generally designated 10, having a construction in accordance with the present invention. Basically, the lawnmower blade 10 includes an elongated center blade section 12, a pair of opposite outer blade sections 14 and a pair of yieldable articulating joints 16.

The center blade section 12 of the lawnmower blade 10 has an elongated body portion 12A and a pair of opposite end portions 12B. Overall, the center blade section 12 has a generally rectangular shape in plan view. The center blade section 12 has no cutting edges defined thereon. The body portion 12A is mounted in any suitable manner to a lower end of a mower crankshaft or drive shaft (not shown). One example of suitable features for facilitating such mounting of the blade 10 is shown in FIG. 1. These mounting features include a central hole 18 through the body portion 12A and a pair of key-hole shaped slots 20 through the body portion 12A on opposite sides of the hole 18. The center blade section 12 also has a pair of holes 22 defined through the respective opposite end portions 12B thereof. Each of the holes 22 are chamfered at their opposite ends, as can be seen in FIG. 5.

The opposite outer blade sections 14 of the lawnmower blade 10 are preferably substantially equal in length to one another. Each outer blade section 14 has a cutting edge 24 machined on a leading or front edge portion thereof and an upturned segment 26 formed for at 40°-45° to the plane of the outer blade section 14 along a trailing or back edge portion thereof creating a vacuum condition as the blade 10 rotates. Overall, the outer blade section 14 has a generally rectangular shape in plan view. Also, each outer blade section 14 has a hole 28 through an one end portion 14A thereof.

Each yieldable articulating joint 16 of the lawnmower blade 10 attaches the one end portion 14A of one of the outer blade sections 14 to one of the opposite end portions 12B of the center blade section 12 such that each outer blade section 14 is yieldably retained in straightened longitudinal alignment with the center blade section 12. Each of the joints 16 has a construction which permits the outer blade sections 14 to yield and pivot upwardly and rotate backwardly relative to a forward direction F of blade rotation about a central axis A of the blade 10 and relative to the center blade section 12 to a damage avoidance position, as shown in FIG. 3 and 4, upon the outer blade sections 14 striking a stationary object. Such upward and backward yielding of the outer blade sections 14 prevents damage to the mower drive shaft and also to the cutting edges 24 on the yielding outer blade sections 14. The construction of the joints 16 further cause the outer blade sections 14 after passing the object to restore to the longitudinally aligned position with the center blade section 12, as shown in FIG. 1, due to response to centrifugal force imposed on the outer blade sections 14 by continued rotation thereof with the center blade section 12.

More particularly, referring to FIGS. 1-3, each joint 15 includes a bolt or fastener 30 and a biasing means in the form of a compressible coil spring 32. The fastener 30 includes an enlarged head portion 30A on one end, a threaded end portion 30B on the opposite end, and a threadless shank portion 30C extending between and interconnecting the head portion 30A and threaded end portion 30B.

As seen in FIG. 5, the shank portion 30C of the fastener 30 is substantially smaller in diameter than a respective one of the holes 22 in the one opposite end portion 12B of the center blade section 12 so as to permit side-to-side pivotal movement of the fastener 30 relative to the center blade section 12. On the other hand, the shank portion 30C of the fastener 30 is only slightly larger in diameter than the diameter of the hole 28 in the respective one end portion 14A of each of the outer blade section 14 so that the fastener 28 when inserted therethrough assumes a press fit relationship with the respective outer blade section 14. As a result, the fastener 30 will pivot relative to the center blade section 12 in conjunction with pivoting of the outer blade section 14 relative thereto. Once each of the fasteners 28 are inserted through the respective holes 28, 22 in the outer blade sections 14 and center blade section 12 so as to dispose the one end portions 14A of the outer blade sections 14 below the opposite end portions 12B of the center blade section, the coil springs 32 are installed over the shank portions 30C of the fasteners 30. Then, annular washers 34 are inserted over the threaded end portions 30B of the fasteners 30, and thereafter lock nuts 36 are threaded onto the threaded end portions 30B of the fasteners 30 to retain the coil springs 32 captured between the washers 34 and the upper sides of the opposite end portions 12B of the center blade section 12.

The compressible coil springs 32 thus mounted about the shank portions 30C of the fasteners 30 bias the one end portions 14A of the outer blade sections and the opposite end portions 12B of the center blade section 12 toward one another. However, the coil springs 32 being compressible are yieldable to permit the one end portions 14A of the outer blade sections 14 to pivot away from the opposite end portions 12B of the center blade section 12, as shown in FIGS. 3 and 5, upon the outer blade section 14 striking an object. Once the blade 10 clears the object, the biasing force of the coil springs 32 and the centrifugal force of the rotating blade 10 causes the outer blade sections 14 to restore to longitudinally aligned positions with the center blade section 12 as seen in FIG. 1.

The length of the outer blade sections 14 compared to the length of the center blade section 12 depends upon the overall length of the lawnmower blade 10. For shorter blades 10, such as ones having lengths of twenty inches or twenty-two inches, the outer blade sections 14 are shorter in length than the center blade section 12. The opposite is true for longer blades 10, such as ones having lengths of twenty-four inches and twenty-five inches.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A lawnmower blade, comprising:
   (a) a center blade section having a pair of opposite end portions and means for mounting said blade to a lower end of a mower drive shaft;
   (b) a pair of opposite outer blade sections each having a cutting edge; and
   (c) a pair of yieldable articulating joints each attaching one end portion of each of said outer blade sections to one of said opposite end portions of said center blade section such that each of said outer blade sections can both pivot upwardly and rotate backwardly relative to a forward direction of blade rotation and to a respective one of said opposite end portions of said center blade section so as to yield upon striking an object and thereby prevent damage to the mower drive shaft and said cutting edges on said yielding outer blade sections;
   (d) each of said yieldable articulating joints including
      (i) means for pivotally connecting one of said opposite end portions of said center blade section with said one end portion of one of said outer blade sections such that said one end portion of said one outer blade section is disposed below said one opposite end portion of said center blade section, and
      (ii) means mounted to said connecting means for biasing said one end portion of said one outer blade section and said one opposite end portion of said center blade section toward one another, said biasing means being yieldable to permit said one end portion of said one outer blade section to pivot away from said one opposite ends of said outer blade section upon said outer blade section striking an object.

2. The blade of claim 1 wherein each of said outer blade sections is substantially equal in length to one another.

3. The blade of claim 1 wherein said outer blade sections are capable of restoring to a straightened longitudinal alignment with said center blade section, after passing the object, due to response to centrifugal force imposed on said outer blade sections by rotation thereof with said center blade section.

4. The blade of claim 1 wherein said biasing means is a compressible coil spring.

5. The blade of claim 1 wherein said center blade section has means for defining a first hole through each of said opposite end portions of said center blade section.

6. The blade of claim 5 wherein each of said outer blade sections has means for defining a second hole through said one end portion of each of said outer blade sections.

7. The blade of claim 6 wherein said connecting means of each of said yieldable articulating joints is a fastener pivotally connecting one of said opposite end portions of said center blade section with said one end portion of one of said outer blade sections such that said one end portion of said one outer blade section is disposed below said one opposite end portion of said center blade section.

8. The blade of claim 7 wherein said fastener has a shank portion extending through said first and second holes respectively in said one opposite end portion of said center blade section and said one end portion of said one outer blade section, said shank portion being press fitted through said second hole and having a cross-sectional size smaller than the size of said first hole.

9. The blade of claim 8 wherein said biasing means of each of said yieldable articulating joints is a coil spring mounted about said shank portion of said fastener and biasing said one end portion of said one outer blade section and said one opposite end portion of said center blade section toward one another, said coil spring being yieldable to permit said one end portion of said one outer blade section to pivot away from said one opposite end portion of said center blade section upon said outer blade section striking an object.

10. The blade of claim 9 wherein each of said yieldable articulating joints further includes a lock element and washer mounted to one end of said fastener spaced from said one opposite end portion of said center blade section, said coil spring being disposed about said fastener and captured between said washer and said one opposite end portion of said center blade section.

11. A lawnmower blade, comprising:
(a) a center blade section having a pair of opposite end portions and means for mounting said blade to a lower end of a mower drive shaft;
(b) a pair of opposite outer blade sections each having a cutting edge, each of said outer blade sections being substantially equal in length to one another; and
(c) a pair of yieldable articulating joints attaching one end portion of each of said outer blade sections to one of said opposite end portions of said center blade section such that both of said outer blade sections are yieldably retained in straightened longitudinal alignment with said center blade section and can pivot upwardly and rotate backwardly relative to a forward direction of blade rotation and to respective ones of said opposite end portions of said center blade section so as to yield upon striking an object and thereby prevent damage to the mower drive shaft and said cutting edges on said yielding outer blade sections;
(d) each of said yieldable articulating joints including
(i) a fastener pivotally connecting one of said opposite end portions of said center blade section with said one end portion of one of said outer blade sections such that said one end portion of said one outer blade section is disposed below said one opposite end portion of said center blade section, and
(ii) means mounted to said fastener for biasing said one end portion of said one outer blade section and said one another, said biasing means being yieldable to permit said one end portion of said one outer blade section to pivot away from said one opposite end portions of said center blade section upon said outer blade section striking an object.

12. The blade of claim 11 wherein said center blade section has means for defining a first hole through each of said opposite end portions of said center blade section.

13. The blade of claim 12 wherein each of said outer blade sections has means for defining a second hole through said one end portion of each of said outer blade sections.

14. The blade of claim 13 wherein said fastener has a shank portion extending through said first and second holes respectively in said one opposite end portion of said center blade section and said one end portion of said one outer blade section, said shank portion being press fitted through said second hole and having a cross-sectional size smaller than the size of said first hole.

15. The blade of claim 14 wherein said biasing means of each of said yieldable articulating joints includes a coil spring mounted about said shank portion of said fastener and biasing said one end portion of said one outer blade section and said one opposite end portion of said center blade section toward one another, said coil spring being yieldable to permit said one end portion of said one outer blade section to pivot away from said one opposite end portion of said center blade section upon said outer blade section striking an object.

16. A lawnmower blade, comprising:
(a) a center blade section having a pair of opposite end portions and means for mounting said blade to a lower end of a mower drive shaft;
(b) a pair of opposite outer blade sections each having a cutting edge, each of said outer blade sections being substantially equal in length to one another; and
(c) a pair of yieldable articulating joints attaching one end portion of each of said outer blade sections to one of said opposite end portions of said center blade section such that both of said outer blade sections are yieldably retained in straightened longitudinal alignment with said center blade section and can pivot upwardly and rotate backwardly relative to a forward direction of blade rotation and to respective ones of said opposite end portions of said center blade section so as to yield upon striking an object and thereby prevent damage to the mower drive shaft and said cutting edges on said yielding outer blade sections, said outer blade sections being capable of restoring to said longitudinal alignment with said center blade section, after passing the object, due to response to centrifugal force imposed on said outer blade sections by rotation thereof with said center blade section;
(d) each of said yieldable articulating joints including (i) a fastener pivotally connecting one of said opposite end portions of said center blade section with said one end portion of one of said outer blade sections such that said one end portion of said one outer blade section is disposed below said one opposite end portion of said center blade section, and (ii) means mounted to said fastener for biasing said one end portion of said one outer blade section and said one opposite end portion of said center blade section toward one another, said biasing means being yieldable to permit said one end portion of said one outer blade section to pivot away from said one opposite end portions of said center blade section upon said outer blade section striking an object.

17. The blade of claim 16 wherein:

said center blade has means for defining a first hole through each of said opposite end portions of said center blade section;

each of said outer blade sections has means for defining a second hole through said one end portion of each of said outer blade sections; and said fastener has a shank portion extending through said first and second holes respectively in said one opposite end portion of said center blade section and said one end portion of said one outer blade section, said shank portion being press fitted through said second hole and having a cross-sectional size smaller than the size of said first hole.

* * * * *